United States Patent
Truckenbrodt et al.

(10) Patent No.: US 7,967,377 B2
(45) Date of Patent: Jun. 28, 2011

(54) AUTO-ADJUST VEHICLE HEADREST

(75) Inventors: Gerd Truckenbrodt, Weiden (DE); Alfred Höss, Tegernheim (DE)

(73) Assignee: Grammer AG, Amberg (DE)

( * ) Notice: Subject to any disclaimer, the term of this patent is extended or adjusted under 35 U.S.C. 154(b) by 666 days.

(21) Appl. No.: 11/803,330

(22) Filed: May 14, 2007

(65) Prior Publication Data

US 2007/0267909 A1  Nov. 22, 2007

(30) Foreign Application Priority Data

May 16, 2006  (DE) .................. 10 2006 023 102

(51) Int. Cl.
  *B60N 2/48* (2006.01)
  *G05D 3/00* (2006.01)
  *A47C 31/12* (2006.01)
  *A47C 7/36* (2006.01)

(52) U.S. Cl. ............... 297/217.3; 297/410; 701/49

(58) Field of Classification Search ............. 297/410, 297/217.3, 216.12; 701/49
  See application file for complete search history.

(56) References Cited

U.S. PATENT DOCUMENTS

| | | | | |
|---|---|---|---|---|
| 3,898,472 A | * | 8/1975 | Long ................. | 180/270 |
| 4,177,421 A | * | 12/1979 | Thornburg .......... | 324/725 |
| 4,295,376 A | * | 10/1981 | Bell .................. | 73/724 |
| 4,300,116 A | * | 11/1981 | Stahovec ........... | 340/904 |
| 4,645,233 A | | 2/1987 | Bruse | |
| 5,166,679 A | * | 11/1992 | Vranish et al. ...... | 340/870.37 |
| 5,373,245 A | * | 12/1994 | Vranish ............. | 324/662 |
| 5,588,673 A | * | 12/1996 | Green et al. ........ | 280/731 |
| 5,848,661 A | * | 12/1998 | Fu .................... | 180/273 |
| 5,882,071 A | * | 3/1999 | Fohl ................. | 297/216.12 |
| 6,042,145 A | * | 3/2000 | Mitschelen et al. .. | 280/735 |
| 6,104,972 A | * | 8/2000 | Miyamoto et al. ... | 701/45 |
| 6,213,548 B1 | * | 4/2001 | Van Wynsberghe et al. ............ | 297/216.12 |
| 6,402,195 B1 | | 6/2002 | Eisenmann ......... | 280/735 |
| 6,437,695 B1 | * | 8/2002 | Eisenmann et al. .. | 340/562 |
| 7,145,263 B2 | | 12/2006 | Nathan | |
| 7,575,085 B2 | * | 8/2009 | Kamizono et al. ... | 180/273 |
| 2003/0090133 A1 | * | 5/2003 | Nathan et al. ...... | 297/217.3 |
| 2004/0199318 A1 | * | 10/2004 | Shieh et al. ........ | 701/45 |
| 2007/0052265 A1 | * | 3/2007 | Sakai et al. ........ | 297/216.12 |

FOREIGN PATENT DOCUMENTS

| | | |
|---|---|---|
| DE | 198 17 199 | 12/1999 |
| DE | 19916804 | 8/2000 |
| DE | 199 33 769 | 1/2001 |
| DE | 100 65 845 | 8/2002 |

\* cited by examiner

*Primary Examiner* — David Dunn
*Assistant Examiner* — Tania Abraham
(74) *Attorney, Agent, or Firm* — Andrew Wilford (57) ABSTRACT

A headrest has a generally stationary support, a headrest body having a forwardly directed front face and positioned such that a head of a user seated in front of the support is generally level with the body, and a guide securing the body to the support for vertical movement relative to the support. A drive can vertically shift the body relative to the support. A sensor assembly has at least three horizontally elongated and vertically spaced electrodes carried on the front face. A controller connected to the electrodes and to the drive means detects a vertical position of the user's head relative to the body and displaces the body so as to centrally align with the user's head.

19 Claims, 3 Drawing Sheets

AUTO-ADJUST VEHICLE HEADREST

FIELD OF THE INVENTION

The present invention relates to a vehicle headrest. More particularly this invention concerns a height-adjustable vehicle headrest.

BACKGROUND OF THE INVENTION

A standard headrest such as used in a motor vehicle comprises a generally stationary support typically formed by a seat back or rear shelf, a headrest body having a forwardly directed front face and positioned such that a head of a user seated in front of the support is generally level with the body, and a guide securing the body to the support for vertical movement relative to the support. The primary function of such a headrest is to protect the user against a whiplash injury that is caused in an collision when the user's head is snapped back suddenly. The headrest prevents excessive backward displacement of the user's head so as to prevent or mitigate any injury that can be caused by overextension of the cervical vertebrae.

For maximum protection the headrest must be positioned so that it solidly engages the center of the back of the user's head. For esthetic and other reasons it is not practical to make the headrest so large that it will function for user's of all sizes, so the above-mentioned vertical adjustability is used to ensure proper positioning. Of course this depends on the headrest actually being adjusted, and practice has shown that users often do not bother to adjust it at all or only roughly set it so that it does not function as needed.

Accordingly it is known to provide a drive for vertically shifting the body relative to the support, some sort of sensor for detecting the vertical position of the user's head, and a controller connected to the sensor and to the drive for displacing headrest body the body so as to centrally align it with the user's head. Typically the headrest is connected to the upper seat back of the vehicle seat via two support rods, and the drive is mounted in the seat back so the headrest with the two support rods can be moved relative to the fixed vehicle seat. Alternatively there is the option for providing the drive in the headrest, in which case the support rods are securely attached to the upper seat back and it is possible to move the headrest along to the fixed support rods . . . .

Thus for example DE 199 33 769 of H-M. Lent-Philipps provides for adjustment of the interior mirror and an angular adjustment of the seat back of the vehicle seat. In such sensor assemblies there is fundamentally the risk that incorrect adjustments, e.g. incorrect adjustments of the interior mirror, will not be recognized by the sensor assembly and thus the headrest will be set incorrectly, as well.

In another known sensor assemblies, such suggested in DE 198 17 199 of W. Buss, transmitters and receivers use for instance ultrasonic signals or infrared signals in order to determine the position of a passenger's head. Other headrests, for instance in accordance with U.S. Pat. No. 4,465,233 of K. Bruse, also suggest light transmitters and receivers. Such sensor assemblies that work with transmitters and receivers of electromagnetic waves and that attempt to measure the reflection of the electromagnetic waves from the passenger's head are termed surface-sensitive sensor assemblies. Problems occur in these cases when the passenger is wearing a head covering, e.g. a hat, or when the passenger is reading a newspaper, because the electromagnetic waves are reflected on any surface, that is also on the head covering or on the newspaper. Thus this can also lead to incorrect positioning of the headrest.

Finally, headrests have also become known that for instance in accordance with DE 100 65 845 of P. Schumann provide contact lines, which require, however, that the passenger's head be positioned against the headrest in order to be able to detect the head position. In U.S. Pat. No. 7,145,263 of Nathan a capacitive sensor is used as the headrest sensor. How such a sensor is embodied cannot be found in this publication, nor does it provide any indication about how a specific embodiment of the measurement electronics or control electronics could be undertaken.

OBJECTS OF THE INVENTION

It is therefore an object of the present invention to provide an improved auto.-adjusting motor-vehicle headrest.

Another object is the provision of such an improved auto-adjusting motor-vehicle headrest that overcomes the above-given disadvantages, in particular that is of simple construction, that detects the user's head position without contact and even through a head covering, and that has minimal moving parts.

SUMMARY OF THE INVENTION

A headrest has a generally stationary support, a headrest body having a forwardly directed front face and positioned such that a head of a user seated in front of the support is generally level with the body, and a guide securing the body to the support for vertical movement relative to the support. According to the invention a drive can vertically shift the body relative to the support, and a sensor assembly has at least three horizontally elongated and vertically spaced electrodes carried on the front face. A controller connected to the electrodes and to the drive means detects a vertical position of the user's head relative to the body and displaces the body so as to centrally align with the user's head.

The principle of the invention is comprised largely in providing as a component of the sensor assembly a special electrode array that has at least three electrodes. The electrodes are spaced apart from one another in the vertical direction and can thus have an upper, a center, and a lower electrode. As will be explained later, it is also possible to select a higher number of electrodes. For instance, it is also possible to provide nine electrodes. However, the inventive device requires at least three electrodes so that a true comparative measurement, which will be explained later, can be performed.

The electrodes extend in a horizontal direction transverse to the vehicle travel direction across a substantial portion of the width of the headrest. A substantial portion of the width of the headrest is considered to be a longitudinal extension of the electrodes that is able to provide accurate measurement results even when the passenger's head is not aligned exactly symmetrically centered on the headrest, but rather deviates from a vertical center plane of the headrest. For instance, the three electrodes each extend across at least one quarter of the width of the headrest. Preferably the three electrodes each extend across more than half the width of the headrest, where necessary even across the entire width or nearly across the entire width of the headrest.

The electrodes are connected via electrical lines to a controller or control unit that is a connected to the sensor assembly. The controller can apply to two electrodes an alternating electrical voltage with a predetermined frequency and a amplitude. For instance, an alternating voltage is applied between the upper and the center electrodes. Thus it is possible to produce an alternating electrical field between the two electrodes. In addition the controller has circuitry that can measure the change in the alternating electrical fields or that can at least determine that the alternating electrical fields have been influenced. For instance, the measurement circuit can measure the mean current flowing through the center electrode. This current measurement permits a conclusion to be drawn about whether material is present between the upper and the center electrodes that has a dielectric constant $\in_r$ that is different from air, which changes the capacitance of the electrode array, or such material is not present, which would not cause a change in capacitance.

For better understanding of the functioning, the upper and center electrodes can be imagined as a type of plate capacitor arrangement that has different capacities depending on whether or not a medium is disposed between the two electrode plates. Two plates in a plate capacitor can be actuated with a suitable alternating current at a predetermined frequency. If a material is disposed between the plates of the plate capacitor and this material has for instance a higher relative dielectric constant $\in_r$ than the dielectric constant of air whose $\in_r=1$, this material influences the capacitance of the plate capacitor, the course of the electrical field lines between the plates, and ultimately also a measurement of the alternating current flowing through the capacitor.

The arrangement including the upper and the center electrodes of the electrode arrangement of the inventive headrest is thus comparable to a plate capacitor with the exception that the electrodes are not actually plate electrodes, and with the exception that the medium to be measured is not oriented precisely between the two electrodes of the plate capacitor but rather on a common side of an imaginary line connecting the two electrodes. Nevertheless, the same physical effects can also be found in the inventive geometrical arrangement in contrast to the example of a plate capacitor provided as an explanatory example in the foregoing. If a medium with a dielectric constant $\in_r \neq \in_{r\,air}$ is disposed in the vicinity of the upper and/or in the vicinity of the center electrode, a measurement, for instance of an alternating current flowing through the center electrode, provides information that some sort of material that is different from air is disposed there.

However, it is not important for the invention to measure the precise dielectricity or dielectric constant or dielectric constant $\in_r$ of the head of the user, but rather on the contrary to adjust the vertical height of the headrest such that it moves to the optimum position for the passenger's head and in particular in the case of a crash can provide the passenger the greatest possible safety. For this, it is necessary for the headrest, when viewed vertically, to be essentially centered at the back of the passenger's head or to be moved as close as possible to the head of the user.

In order to be able to determine the position of the passenger's head, the inventive headrest makes it possible to perform a comparative measurement between the center and the upper electrodes, on the one hand, and between the center and the lower electrodes on the other hand. For instance, the center electrode is disposed precisely in the center of the headrest, relative to the vertical extension. The upper electrode can be spaced apart relative to the center electrode at a first fixed spacing and the lower electrode can be spaced apart and below the center electrode at the same fixed spacing.

If the headrest is aligned optimally to the current head position of the passenger, the center electrode should be disposed at approximately the height of the center of gravity of the passenger's head. As investigations have shown, the center of gravity of the passenger's head is typically in an area at a height of the head at which the head possesses a certain bulge to the rear when the headrest is optimally aligned, the center electrode is disposed relative to the headrest in its current headrest position, that is, approximately directly adjacent to this bulge.

At this optimum headrest alignment, if the sensor assembly performs a measurement between the upper electrode and the center electrode by application of an alternating electrical field between the electrodes and for instance the alternating current flowing through this electrode array is measured, the detection unit obtains a measured value in which the dielectricity or dielectric constant $\in_r$ of an area of the passenger's head, in particular of an area of the bulge, is included. If the sensor assembly now performs a second measurement between the center electrode and the lower electrode in exactly the same manner, this second measurement provides a second measurement result that will not differ significantly from the first measurement result, since the head, relative to a plane that extends largely horizontally and passing largely through the center of gravity and the previously mentioned bulge, is largely mirror symmetrical to a horizontal plane passing through the bulge in question, at least in terms of dielectric behavior.

In fact, it is possible in this case to speak of a dielectricity or dielectric constant model or tensor that can detect the head of a user as a three-dimensional matrix in figures. However, as an approximation and for the sake of simplicity, a mirror-symmetrical embodiment of such a dielectricity or dielectric constant module will be assumed in the following as the electrotechnical or physical depiction of a passenger's head in the alternating electrical field.

However, it still can be the case that the measurement results of a first measurement between the upper and center electrodes and a second measurement between the center and lower electrodes will not differ, or will not differ significantly, when the headrest is optimally aligned. In any case, a comparison of the two measurement results can be interpreted by the sensor assembly or by a comparator or controller or control electronics forming part of the sensor assembly such that no change is required for the headrest position because the headrest has already reached its optimum position.

Now the case shall be described in which the headrest assumes a non-optimum relative position and has moved too high, for instance. In this position, the center of gravity of the head is below the center electrode. Again it should be assumed that the center electrode, when seen from the vertical direction, is oriented largely in the center of the headrest. A measurement between the upper electrode and the center electrode in this situation will lead to a different measurement result than a measurement between the center electrode and the lower electrode. The reason for this is that the center of gravity of the head, and thus also a center of gravity of the dielectricity or dielectric constant module, is below the center electrode. The alternating electrical field between the upper electrode and the center electrode is now influenced by the head differently than the alternating electrical field between the center electrode and the lower electrode. This different effect leads to different fields of lines of electric flux or to different capacities for an imaginary capacitor embodied by two electrodes. The different measurement results of the first measurement between the upper and the center electrode and the second measurement between the center and the lower electrode can now be recognized or interpreted by the sensor assembly or by a controller or control electronics allocated thereto such that an optimum position of the headrest relative to the seat has not yet been reached, and thus the height of the headrest must be adjusted by the drive. Upon determining this previously mentioned result of a comparison of the measurement values, the controller or the control electronics will ensure that the headrest is moved downward by a predetermined fixed path of travel or even by a path of travel to be determined based on the comparison of the measurement results. Then another measurement and a comparison of the measurement results obtained can be performed in order to check whether or that the headrest has been moved to an optimum position. If, after performing a comparison of the measurement results, the sensor assembly determines that the optimum position has not been attained, the optimum headrest position can be reached directly either by moving the headrest along a predetermined path of travel or alternatively many short, successively sequential movements can be performed. If a plurality of short paths of travel are to be traveled successively, it is recommended that faster measurement electronics and a faster drive are used than would be necessary if only a single movement is to be provided all at once for attaining the optimum headrest position.

It should be established that the inventive headrest, due to an electrode array with at least three electrodes, permits a comparative measurement, i.e. it executes a first measurement and then a second measurement and subsequently a comparison of both measurements. Such a comparative measurement can provide measurement results in a very simple manner that can provide information to a controller or control electronics regarding whether the headrest is disposed in the optimum position relative to the center of the passenger's head or is in a non-optimum position, either too high or too low relative to the position of the head.

Thus it is possible to detect the position of the head independent of other sensors such as for instance seat occupancy sensors. In addition, there is no need for an absolute measurement of the relative dielectricity or dielectric constant of the head, which would fundamentally be fraught with numerous uncertainties. Using the proposed electrode array with three electrodes and the resultant opportunity to compare measurement results, a measurement signal can be attained with great reliability that immediately provides information about the relative position of the head with respect to the center electrode of the headrest. Consequently there is also no need for reference values. Furthermore if the person is wearing a hat, this structure, which typically is wholly dielectric and in fact invisible to the capacitative sensor, will be ignored.

The electrodes can be formed by elongated strips or by flat, longitudinally extended, for instance also rectangular, electrically conductive bodies, for instance metal films, metal plate elements, prints, or the like. The electrode array is connected to a controller with which a first measurement can be performed between the upper and the center electrodes and a second measurement can be performed between the center and the lower electrodes. The measurements to be performed can include for instance actuation of the electrodes with an alternating voltage or with pulses, and can provide a measurement of the alternating current flowing through the electrodes. Alternatively, it is also possible to apply to one of the two electrodes voltage signals voltage pulses or alternating voltage signals for instance, and to measure the induced voltage signal obtained on the other, opposing electrode. In any case, between each pair of electrodes alternating electrical fields are produced that can be influenced by a passenger's head in the vicinity. This influence can be detected for instance via a voltage or current measurement. With regard to the type and manner in which the relative dielectricity or dielectric constant, also called relative permittivity, is measured, as well as the explanation of the physical background, refer to German patent U.S. Pat. No. 6,642,723 of A. Blank gives a detailed description of the physical effects when material is disposed in an alternating electrical field.

The results of the first measurement and the second measurement are comparable to one another. This comparison permits a simple conclusion to be drawn regarding the relative headrest position with respect to the center electrode. Preferably an alternating electrical field can be applied between each two electrodes by means of the controller. The controller, or a part of the controller, in any case a part of the sensor assembly, can for this purpose apply an alternating voltage of a predetermined amplitude and frequency between two electrodes, that is, for performing the first measurement between the upper and the center electrodes and for performing the second measurement between the center and the lower electrodes.

The first and the second measurement each provide a measurement result that includes the dielectricity or dielectric constant $\in_r$ of the passenger's head, or at least of part of the passenger's head, in particular the area of the bulge. Such a measurement can in particular also be a capacitance measurement, the measurement of the capacitance not being the objective of the measurement, but merely a comparison measurement to be performed for determining a relative position of the head relative to the headrest. Nevertheless, depending on the design of the measuring circuitry, the capacitance of one area of the passenger's head is included.

The sensor assembly has a comparator with which the results of the first measurement and of the second measurement can be compared to one another. The comparator can be for instance a conventionally known electronic component that compares the measurement values of two measurement results to one another and depending on the comparison performed can also decide whether the headrest is moved or not, and in which direction it is moved, and where necessary can also decide on much the headrest needs to be moved. For instance, the detection unit can be equipped with electronics that also have a memory in which are stored tabular data that can be recalled. The tabular data can contain for instance information indicating that a comparison between a first measurement value and a second measurement value determines, depending on the comparison value obtained, that there will be a long movement or a short movement.

The electrode array can be connected to a controller. Preferably each electrode is connected to the controller via a separate supply line. The controller can actuate the electrodes in that it supplies them with pulse signals or with alternating voltage. However, the electrode array can preferably only be read via the connection to the controller, the unit with which a current or voltage measurement is performed being preferably also a component of the controller.

The controller can be mounted in the headrest so as to be very compact. Alternatively, the controller can also be mounted in the seat back of the vehicle seat and can be connected to the electrode array via electrical lines that preferably run through hollow support rods for the body of the headrest.

Alternatively, the controller can also be mounted in the seat frame of the vehicle seat or alternatively it can be arranged in an area at a spacing from the seat of the vehicle. If the controller is provided in the headrest, complex cabling can be reduced. Depending on the dimensions of the controller, however, it is just as possible to provide the controller far from the headrest.

The headrest is attached to the vehicle seat via at least one support rod, preferably via two support rods. The support rods enable the headrest to move relative to the vehicle seat, either relative to the seat back of the vehicle seat or relative to the headrest.

The drive for moving the headrest relative to the vehicle seat is preferably provided in a seat back of the vehicle seat. Alternatively it is conceivable that the drive for moving the headrest is provided in the headrest.

Moreover, preferably a metallic shield can be provided for the electrode array. The shield is preferably mounted on the side of the electrode array that faces away from the head. The metallic shield can be formed for instance from a thin metal film that is provided immediately adjacent the electrode array. As trials have demonstrated, such a shield can increase the measurement accuracy of the device.

The electrode array is preferably provided near the front side of the headrest that faces the passenger's head. This facilitates a particularly precise measurement, since the spacing between the passenger's head and the electrode array is minimized in this manner. In this context it should be remarked that contactless detection of the position of the head relative to the headrest is performed with the inventive headrest. It is not necessary for the head to contact the front side of the headrest. This does not interfere with the measurement.

In contrast to the surface-sensitive measurements using reflections of the electromagnetic waves on limiting surfaces, described above, a volume measurement occurs using the capacitive measurement, described in the foregoing, via the change in the alternating electrical fields. A measurement of material properties is performed, the increased content of water in the area of the head, which is clearly higher than the water content of the air in the passenger compartment, providing a reliable indication of where the passenger's head is, regardless of whether there are head coverings on this head or not.

Furthermore, using the described typical skull shape in the form of a bulge, an exposed head area faces the headrest and is available for measurement and is at the same height of the head as its center of gravity. Thus in any case the area of the bulge of the head can be detected in terms of its dielectric properties in the alternating field and the position of the head can be situated in a manner that can be precisely detected by the sensor assembly.

In one advantageous embodiment of the invention the electrode array is formed as a film. This enables particularly simple construction and assembly of the inventive headrest. The film-type electrode array can be for instance a laminate, similar to what is known from seat occupancy films where the metallic electrodes are printed on the film, in particular onto a layer of the film. The conductors that connect the electrodes to the controller can also be at least in part components of the film. In the context of the invention, e.g. a thin, flat, where necessary also flexible structure that in some circumstances can also approximate a contour of the headrest or a part of the headrest can also be called film.

In another advantageous embodiment of the invention, the electrode array is provided between a cushioned part of the headrest and a harder body of the headrest. In a conventional headrest structure, this embodiment of the invention enables simple addition of the electrode array, the very thin, for instance film-type, electrode array being provided between the cushioned part and the reference part, that is for instance a textile or leather covering in the headrest. Using the corresponding thin, preferably also flexible, embodiment of the electrode array, there is no negative impact on the mechanical properties of the cushioned part or the comfort of the headrest provided by the elastically compressible cushioned part. In one alternative embodiment of the invention, the electrode array is provided between a the rigid headrest body and a cushion. The body is for instance formed from a plastic box that is also called the cushion support. The cushion typically surrounds this backing on all sides. The electrode array can for instance, but does not necessarily have to, be provided as film electrodes between the backing and the cushioned part. In this embodiment of the invention the electrode array has no effect on the comfort of the cushioned part, even if it is not flexible.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
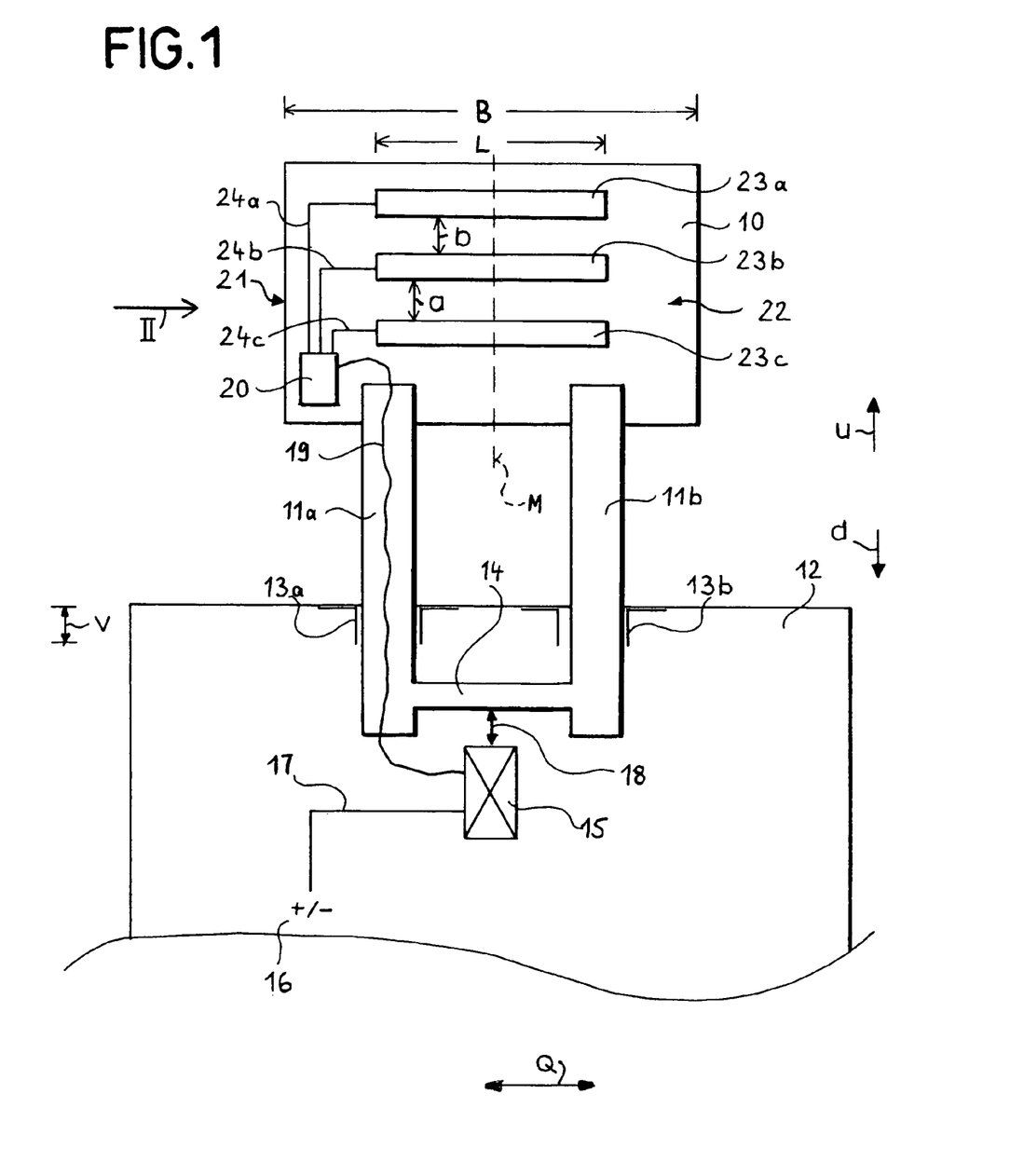
FIG. 1 is a schematic partly sectional view of an embodiment of the inventive headrest that is joined to a head area of a seat back of a vehicle seat via two support rods, the headrest having an electrode array with three electrodes.
Figure 2:
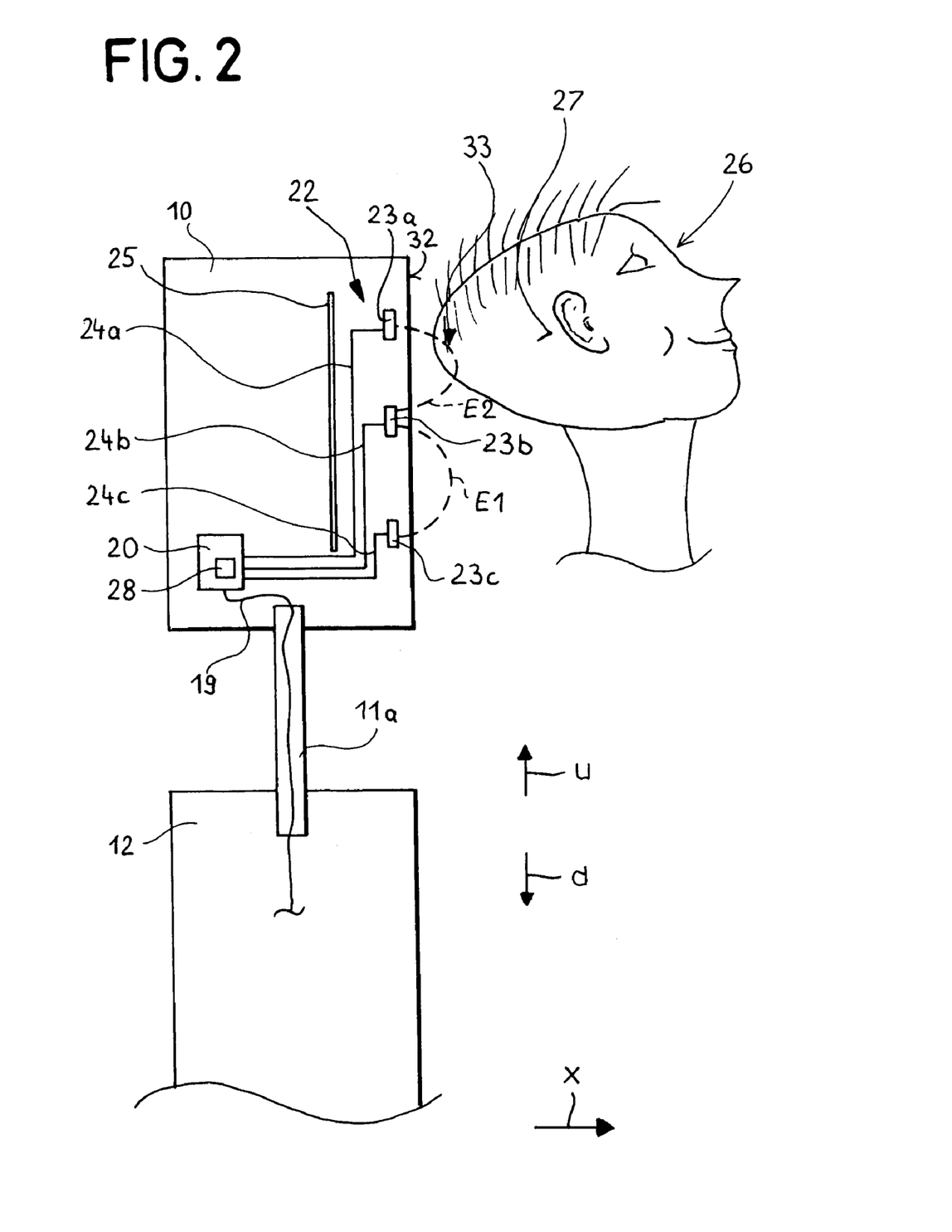
FIG. 2 is sectional side view taken in the direction of arrow II of FIG. 1.

As seen in FIGS. 1 and 2 an inventive headrest 10 is oriented generally transverse to a standard vehicle travel direction x. The headrest 10 is typically attached to a vehicle seat 12, specifically to the upper end of the seat back, via two support rods 11a and 11b. For this purpose, the upper seat back is provided with guide 13a and 13b that receive the support rods 11a and 11b and that permit axial movement in an upward direction u and downward direction d. In the illustrated embodiment depicted in FIG. 1, the two support rods 11a and 11b are joined to one another via a cross member 14. The seat back 12 holds a schematically illustrated actuator or drive 15 and a mechanical link 18 to the cross member 14. The drive 15 is connected via a voltage supply line 17 to a voltage source 16, typically the battery of the vehicle.

The drive 15 can act on the transverse cross member 14 or on one or both of the support rods 11a and 11b and in this manner can move the headrest 10 vertically, that is can change its height relative to the vehicle seat 12. The movement stroke V can be for instance on an order of magnitude of 100 mm.

The headrest 10 has a sensor assembly 21 comprising to a controller 20 and an electrode array 22. The electrode array 22 includes three electrodes, specifically an upper electrode 23a, a center electrode 23b, and a lower electrode 23c, each connected to the controller 20 via a respective supply lines 24a, 24b, or 24c. The upper electrode 23a is set at a vertical spacing b from the center electrode 23b, and the center electrode 23b is set at a vertical spacing a above the lower electrode 23c. The two spacings a and b are fixed, and the entire electrode array 22 is a prefabricated unit. The electrode array 22 can for instance be formed as a film-type subassembly. In such an embodiment, the three electrodes 23a, 23b, and 23c can be embedded in a film, the metallic electrodes themselves being printed on a film. The spacings a and b are preferably selected to be identical. If more than three electrodes are provided, there can also be a plurality of center electrodes, for instance an upper center electrode and a lower center electrode. As will be seen below, it is important for the inventive headrest 10 that a comparative measurement can be performed so that an upper measurement and a lower measurement can be performed and the upper and the lower measurement can be compared to one another.

The controller 20 and the associated comparator 28, which is shown in FIG. 2 but not in FIG. 1, can be designed in any desired, suitable manner. The controller 20 can also contain measurement electronics or measurement electronics in the form of suitable electrical or electronic components. The measurement electronics or the controller 20 can include for instance amplifier circuits in order to amplify the measurement signals in a suitable manner. The controller 20 can be for instance the electronic "Motorola Freescale Semiconductor 33794," which has appropriate measurement inputs and outputs. Information about this processor can be obtained for instance at www.freescale.com.

As shown in FIG. 1, each electrode 23a, 23b, and 23c has an axial length L that extends across a substantial portion of a width B of the headrest 10 in the transverse direction Q of the vehicle. In the illustrated embodiment depicted in FIG. 1, the axial length L covers about half the width B. In illustrated embodiments that are not shown, the electrodes 23a, 23b, and 23c are even longer and can even extend for instance across nearly the entire width B of the headrest 10. In another illustrated embodiment of the invention, which is also not shown, the electrodes 23a, 23b, and 23c are shorter and extend across a little more than one quarter of the width B of the headrest. A center symmetry plane M of the headrest can be seen in FIG. 1. The more the position of a passenger's head deviates from a center position, that is, from a symmetrical position relative to this center plane M, the more difficult the measurement that is to be described later. Hence the longest electrodes are least sensitive to such offset from the center plane M.

In the illustrated embodiment of FIG. 1, the three electrodes 23a, 23b, and 23c are rectangular. It should be noted that the physical design of the three electrodes 23a, 23b, and 23c is not important. The three electrodes 23a, 23b, and 23c can also each be for instance in largely linear, that is very thin measured vertically.

FIG. 2 shows a head 26 of a passenger in the vehicle seat having the back 12. A space exists between the head 26 of the passenger and a front side 32, showing that it is possible to detect head position in a contactless manner with the inventive headrest. In FIG. 2 the head position and headrest position are optimal, here too low. Specifically, it is clear that the headrest as shown in FIG. 2 really has a somewhat different contour and in particular is rounded in the upper area. In addition FIG. 2 is not to scale, but rather the headrest is typically made somewhat smaller than depicted in FIG. 2 relative to the dimensions of a passenger's head 26.

There is a bulge 33 in the passenger's head 26. Typically every person has such a bulge 33, which is that portion of the human head that projects farthest to the rear. In FIG. 2 the bulge 33 is exaggerated. In a medical context, such a bulge in the skull is called the protuberantia occipitalis externa, and the area that projects the farthest to the rear is the occipital bone, that is the cranial plate on the lower occiput.

A center of gravity 27 of a passenger's head 26 is typically in the area of the bulge 33 of the head 26, especially at the same height as the bulge 33. Thus, if it is possible to determine the position of the bulge 33, this also provides an indication about the position of the center of gravity 27 of the head 26.

The inventive headrest 10 provides the opportunity to automatically detect the head position relative to the current headrest position and to move the headrest 10 to attain the optimum alignment of the headrest 10 relative to the passenger's head 26. Proceeding from a position in accordance with FIG. 2, it would therefore be desirable to move the headrest 10 in the upward direction u until the center electrode 23b is oriented approximately at the height of the center of gravity 27 of the head 26, that is level with the bulge 33 of the head 26.

For this purpose, an alternating voltage produced by the controller 20 is first applied at a predetermined voltage amplitude and a predetermined frequency between the upper electrode 23a and the center electrode 23b. This leads to the production of an electrical field whose field lines are shown at $E_2$ in FIG. 2. It should be noted, in contrast to the illustration, there are actually a plurality of field lines. A measurement of capacitance can be performed between the upper electrode 23a and the center electrode 23b.

After the measurement has been performed, or even if necessary at the same time, a measurement can also be performed between the center electrode 23b and the lower electrode 23c. The controller 20 thus applies an alternating voltage signal between the center electrode 23b and the lower electrode 23c so that an electrical field is formed as indicated in FIG. 2 by a field line $E_1$.

The controller 20 has a measuring device (not shown) that makes it possible for instance to measure the alternating current flowing through the center electrode 23b or an alternating voltage signal induced in the center electrode 23b when a voltage amplitude of an alternating voltage is applied to the respective electrodes 23a or 23c. The measured signal is influenced when the passenger's head 26 is situated between the two electrodes during each of the measurements of the activated electrodes.

FIG. 2 illustrates that the bulge 33 of the head 26 projects into the electrical field between the upper electrode 23a and the center electrode 23b. In other words, the electrical field lines pass through the bulge 33 of the head 26. Since the head 26 of a person has a very high proportion of water, and since the dielectricity or dielectric constant $\in_r$ of water is on the order of magnitude of 81, while the dielectricity or dielectric constant $\in_r$ of air is on the order of magnitude of 1, the bulge 33 of the head 26 influences the result of the measurement between the electrodes 23a and 23b. However, since the bulge 23 is not in the immediate vicinity of the electrodes 23b and 23c, the result of the measurement between these two electrodes 23b and 23c is influenced only to a very small extent, if at all, by the bulge 33.

The measurement between the upper and the center electrode will thus lead to a measurement result that is influenced to a great degree by the head 26, while a measurement between the center and the lower electrodes is not influenced as much. Thus given the relative position of the headrest 10 in FIG. 2, comparing the two measurement results from the two measurements will reveal a difference. From this difference, the controller 20 can recognize that the headrest is set too low with respect to the current head position and therefore must be moved in the upward direction u.

If this was an optimum headrest position, a measurement between the upper electrode 23a and the center electrode 23b on the one hand and a measurement between the lower electrode 23c and the center electrode 23b on the other hand would lead to identical or in any case very similar measurement results so that after a comparison of the two measurement results the controller 20 could determine that an optimum headrest position has been attained and no further movement is necessary.

A comparator 28 that can be in particular a component of the controller 20 can compare the results of the two measurements. Preferably the controller 20 is a potted integrated circuit in which the necessary electronic components are provided. The controller 20 can for instance also contain one or more memories in which the measurement results can be temporarily stored. The controller 20 can also contain comparison values that are stored in a tabular fashion and from which for instance the controller 20 can also calculate the extent of movement v that the headrest 10 must travel in order to attain an optimum headrest position given the measurement results.

The measurements for detecting the head position relative to the current relative position of the head rest can be performed continuously or at predetermined times, preferably at specific intervals. Preferably an initial measurement is performed at the beginning or prior to the beginning of a trip with the vehicle. After the headrest 10 has been moved, a check can be performed to determine whether an optimum headrest position was attained after the movement. Finally, it is also possible to perform another check of the headrest position at certain intervals, for instance every 15 minutes or the like, during the trip and when needed to cause the headrest 10 to be moved.

It should be noted that the function has merely been described schematically. The drawings consequently merely provide diagram-like depictions, whereby it is clear to one skilled in the art that for instance a cable 19 connecting the controller 20 to the drive motor 15 and also the voltage supply line 17 are typically embodied at least with two wires. Moreover, as a result of the measurement values determined after a comparison is performed by the comparator 28, the controller 20 can transmit appropriate control signals via the line 19 to the drive motor 15 to move the headrest or not.

The inventive headrest does not have to have a cross member 14 and direct actuation of the headrest support rod 11a and 11b via a drive motor 15 can be provided to move the headrest. What is more, the drive 15 can also be provided in the headrest 10 and can move the headrest relative to the support rods 11a and 11b.

FIG. 2 shows a metallic shield 25 that is provided on the side of the electrode array 22 that faces away from the head 26. The shield 25 can comprise for instance a metal foil, e.g., copper, and is provided immediately adjacent the electrode array 22. Tests have shown that the shield increases the accuracy of the device. The shield 25 advantageously extends across almost the entire width B and height of the headrest 10, at least across an area that is determined in terms of the its contour by the exterior dimensions of the electrodes 23a, 23b, and 23c.

Figure 3:
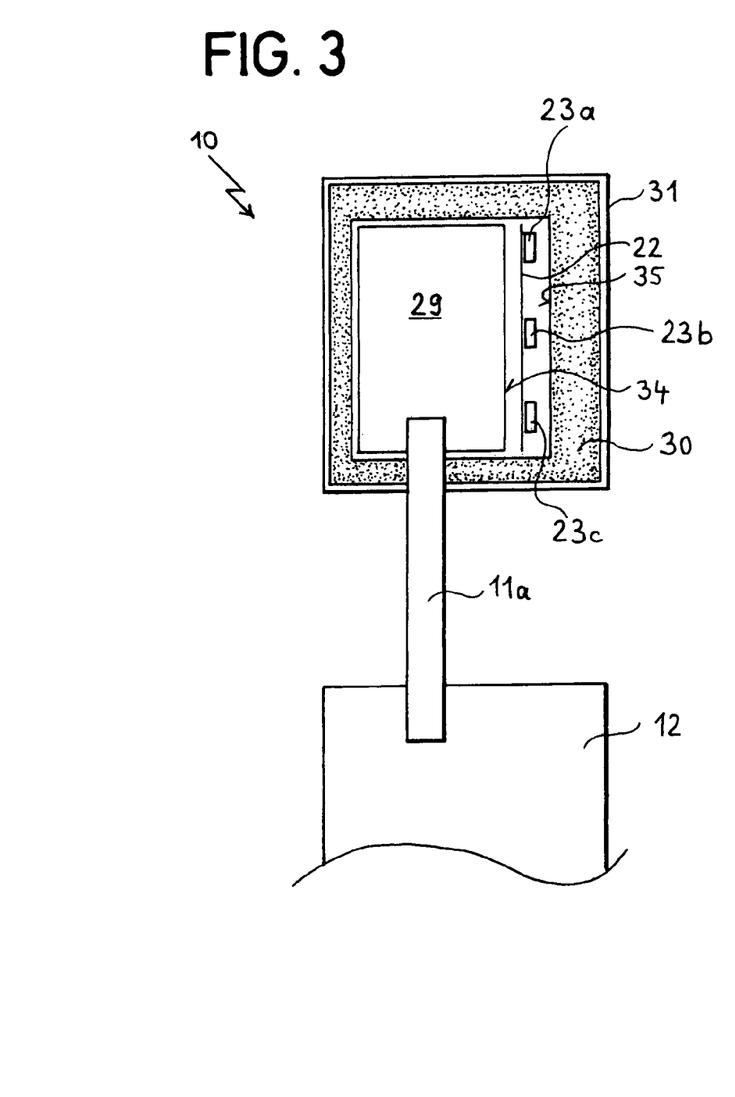
FIG. 3 is a vertical section through another embodiment of a headrest in a view similar to that in FIG. 2.

FIG. 3 shown an embodiment in which a cushion support body 29, comprising for instance plastic, is surrounded on all sides by a foam cushion 30. The cushion 30 is in turn enclosed by a leather or textile cover 31. The cushion 30 ensures comfort and the desired damping and mechanical safety properties for the headrest. The electrode array 22 with the three electrodes 23a, 23b, and 23c is provided in FIG. 3 between the front side 34 of the cushion support body 29 and an interior face 35 of the cushion 30. Furthermore, in FIG. 3 the size of the electrode array 22 is shown exaggeratedly large even though in reality it is made of a thin film, the thickness of which is negligible. The three electrodes 23a, 23b, and 23c are printed on a part of the film and thus have a slight thickness that is typically far less than 1 mm.

Figure 4:
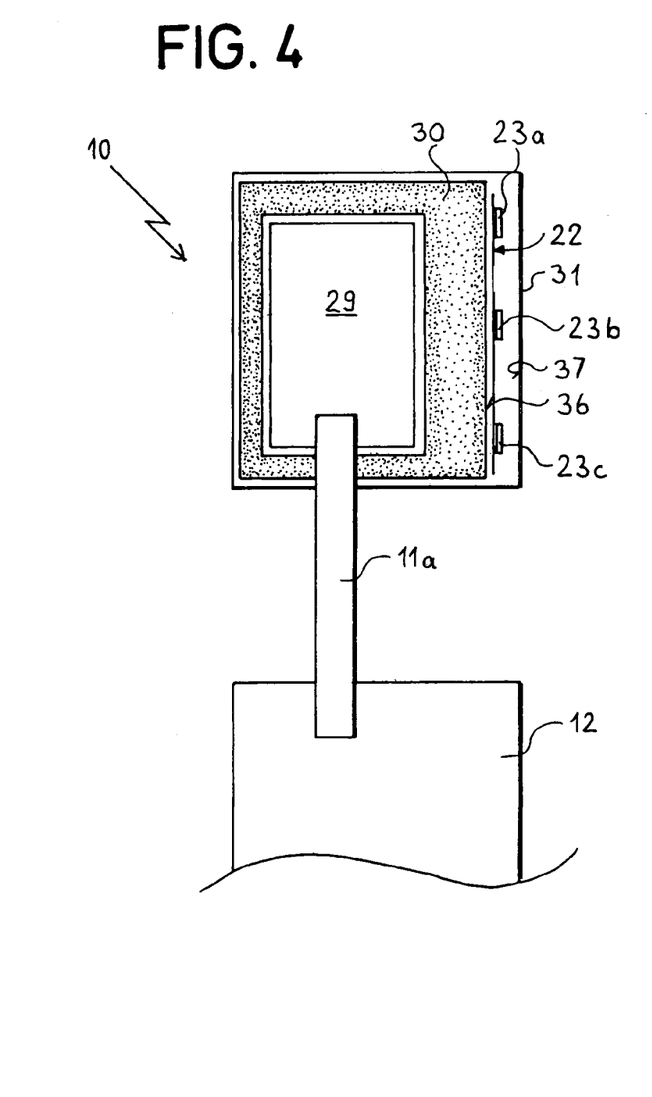
FIG. 4 is a view like FIG. 3 of another illustrated embodiment of an inventive headrest.

In an alternative illustrated embodiment in accordance with FIG. 4, the electrode array 22 is provided between an outside face 36 of the cushion 30 and an inner face 37 of the cover 31. In this design, the electrode array 22 is made flexible enough that it does not have a negative impact on the compressibility of the cushion 30. Again, FIG. 4 depicts the electrodes 23a, 23b, and 23c on an exaggerated scale with respect to thickness.

In both FIGS. 3 and 4, the cover 31 is illustrated offset from the cushion 30, but in reality it is directly adjacent, i.e., is not spaced apart from, the outer side of the cushioned part 30 or the electrode array 22. Similarly for clarity of view FIGS. 3 and 4 do not show either the cross member nor the drive motor nor the various electrical connections.

We claim:

1. A headrest comprising:
   a generally stationary support;
   a headrest body positioned such that a head of a user seated in front of the support is generally level with the body;
   a guide securing the body to the support for vertical movement relative to the support;
   drive means for vertically shifting the body relative to the support;
   a sensor assembly having at least three horizontally elongated and vertically spaced electrodes carried on the body, each of the electrodes extending over at least one quarter of a horizontal length of the headrest; and
   control means connected to the electrodes and to the drive means for generating an electric field forward of the electrodes, sensing the capacitance between adjacent electrodes, determining from changes in the sensed capacitance a vertical position of the user's head relative to the body from changes in the field and displacing the body so as to centrally align with the user's head.

2. The headrest defined in claim 1 wherein the electrodes include an upper electrode, a center electrode wholly below the upper electrode, and a lower electrode wholly below the center electrode.

3. The headrest defined in claim 2 wherein the sensor assembly further includes a mount secured to the body, the electrodes being fixed to the mount.

4. The headrest defined in claim 3 wherein the mount is a flexible dielectric sheet and the electrodes are elongated foils laminated to the sheet.

5. The headrest defined in claim 4 wherein the headrest body is generally rigid, the headrest further comprising a flexible cover surrounding the body with the mount and electrodes between the cover and the body.

6. The headrest defined in claim 5, further comprising a cushion between the cover and the electrodes.

7. The headrest defined in claim 5, further comprising a cushion between the body and the electrodes.

8. The headrest defined in claim 2 wherein the control means operates by applying a voltage between the center electrode and one of the upper and lower electrodes and then applying a voltage between the center electrode and the other of the upper and lower electrodes.

9. The headrest defined in claim 8 wherein the voltage is applied as an alternating current.

10. The headrest defined in claim 9 wherein the control means includes
    comparator means for comparing a dielectric constant between the upper electrode and the center electrode with a dielectric constant between the lower electrode and the center electrode.

11. The headrest defined in claim 1 wherein the control means is mounted on the body.

12. The headrest defined in claim 1 wherein the guide means includes a support rod extending between the body and the support.

13. The headrest defined in claim 12 wherein the rod is fixed in the body and slidable in the support, the drive means including an actuator mounted in the support and operatively connected to the rod.

14. The headrest defined in claim 12, further comprising electrical feed and control lines extending through the rod between the electrode assembly, control means, and drive means.

15. The headrest defined in claim 1 wherein the support is a seat back of a vehicle.

16. The headrest defined in claim 1, further comprising a dielectric cover overlying the electrodes and between the electrodes and the user's head.

17. The headrest defined in claim 1, further comprising a vertical metallic shield on the body rearward of the electrodes, whereby the field is forward of the electrodes.

18. The headrest defined in claim 17 wherein the shield is a vertical conductive sheet.

19. A headrest comprising:
a generally stationary support;
a headrest body positioned such that a head of a user seated in front of the support is generally level with the body;
a vertical shield on the body;
a guide securing the body to the support for vertical movement relative to the support;
drive means for vertically shifting the body relative to the support;
upper, center, and lower horizontally elongated and vertically spaced electrodes carried on the body forward of the shield plate;
a dielectric cover covering the electrodes and preventing direct contact of the user's head with the electrodes; and
control means connected to the electrodes and to the drive means for
applying alternating current to the electrodes to create an electric field forward of the electrodes and of the shield,
sensing the capacitance between adjacent electrodes,
determining from changes in the sensed capacitance a vertical position of the user's head relative to the body from changes in the field, and
displacing the body so as to centrally align with the user's head.

* * * * *